(12) United States Patent
Han et al.

(10) Patent No.: US 9,626,027 B2
(45) Date of Patent: Apr. 18, 2017

(54) TOUCH SENSOR INTEGRATED TYPE DISPLAY DEVICE

(71) Applicant: LG Display Co., Ltd., Seoul (KR)

(72) Inventors: Manhyeop Han, Seoul (KR); Juhan Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 119 days.

(21) Appl. No.: 14/457,238

(22) Filed: Aug. 12, 2014

(65) Prior Publication Data

US 2015/0084888 A1 Mar. 26, 2015

(30) Foreign Application Priority Data

Sep. 23, 2013 (KR) .................. 10-2013-0112803

(51) Int. Cl.
*G06F 3/041* (2006.01)

(52) U.S. Cl.
CPC .......... *G06F 3/0412* (2013.01); *G06F 3/0416* (2013.01); *G06F 2203/04103* (2013.01)

(58) Field of Classification Search
CPC ........ G06F 3/041; G06F 3/0412; G06F 3/038; G06F 3/044; G06F 3/045; G06F 3/0416; G06F 2203/04103; G02F 1/1343; G02F 1/1345
See application file for complete search history.

(56) References Cited

U.S. PATENT DOCUMENTS

| | | | |
|---|---|---|---|
| 2003/0117566 A1* | 6/2003 | Park ................... | G02F 1/13452 349/149 |
| 2009/0267916 A1* | 10/2009 | Hotelling ............... | G06F 3/044 345/174 |
| 2010/0123866 A1* | 5/2010 | Chang ............... | G02F 1/136286 349/141 |
| 2010/0149108 A1* | 6/2010 | Hotelling ............... | G06F 3/044 345/173 |
| 2013/0016065 A1* | 1/2013 | Reynolds ............. | G06F 3/0412 345/174 |
| 2013/0147724 A1* | 6/2013 | Hwang ................ | G06F 3/0412 345/173 |

* cited by examiner

*Primary Examiner* — Lun-Yi Lao
*Assistant Examiner* — Johny Lau
(74) *Attorney, Agent, or Firm* — Morgan, Lewis & Bockius LLP

(57) ABSTRACT

Provided is a touch sensor integrated type display device. The device includes: an active area (AA), a bezel area (BA) outside the AA, the BA including: a data driving integrated circuit (IC), a flexible printed circuit (FPC) board, a gate driving IC, and gate line-on-glass (LOG) wires between the FPC board and the gate driving IC, first electrodes in the AA and crossing in first and second directions, second electrodes in the AA, arranged in the second direction and alternately disposed with the first electrodes along the first direction, grouping wires in the BA in parallel between the AA and the data driving IC, having different lengths, such that the grouping wires are non-overlapped with the gate LOG wires, and first sub-routing wires connecting the first electrodes, corresponding to one line in the first direction, to each of the grouping wires.

11 Claims, 6 Drawing Sheets

TOUCH SENSOR INTEGRATED TYPE DISPLAY DEVICE

CROSS-REFERENCE TO RELATED APPLICATION(S)

The present application claims benefit and priority under 35 U.S.C. §119(a) of Korean Patent Application No. 10-2013-0112803, filed on Sep. 23, 2013, the entire disclosure of which is hereby incorporated by reference herein for all purposes.

BACKGROUND

1. Technical Field

The following description relates to a touch sensor integrated type display device, and, more particularly, a touch sensor integrated type display device capable of improving touch performance.

2. Discussion of the Related Art

In recent years, various input devices such as a keyboard, a mouse, a joystick and a digitizer have been used to interface between a user and home appliances or telecommunication devices. However, when a user makes use of the input devices, the user's dissatisfaction may increase because the user is required to learn how to use the different input devices and because the input devices occupy space. Therefore, a convenient and simple input device that can reduce erroneous operation is required. According to this desire, there is a touch sensor that can input information by directly contacting a screen with a user's finger or a pen while seeing the input devices.

The touch sensor has a simple configuration capable of minimizing erroneous operations. Also, the user can perform an input action without using a separate input device, and can quickly and easily manipulate a device through contents displayed on a screen. Accordingly, the touch sensor has been applied to various display devices.

The touch sensor used in the display devices may be classified into an add-on type touch sensor, an on-cell type touch sensor, and an integrated type (which is also called an "in-cell" type) touch sensor. The add-on type touch sensor is configured such that a display device and a touch sensor are individually and/or separately manufactured, and then the touch sensor is attached to an upper substrate or an upper portion of the display device. The on-cell type touch sensor is configured such that components constituting a touch sensor are directly formed on the surface of an upper portion of the display device, such as an upper glass substrate. The integrated type touch sensor is configured such that a touch sensor is integrated into a display device to make it a thin shape and enhance durability thereof.

The add-on type touch sensor causes the thickness of a display device to increase because the add-on type touch sensor has a structure in which the add-on type touch sensor is mounted on the display device. Further, visibility of the display device is reduced because of a reduction in brightness of the display device resulting from the increased thickness.

On the other hand, the on-cell type touch sensor shares the glass substrate with the display device because the on-cell type touch sensor has the structure in which the on-cell type touch sensor is formed on the surface of the glass substrate of the display device. Therefore, a thickness of the display device using the on-cell type touch sensor is less than a thickness of the display device using the add-on type touch sensor. However, the entire thickness of the display device implementing the on-cell type touch sensor increases because of a touch driving electrode layer, a touch sensing electrode layer, and an insulating layer for insulating the touch driving electrode layer and the touch sensing electrode layer which constitute the on-cell type touch sensor.

Accordingly, there is a focus on the integrated type touch sensor in that it is possible to achieve a thin display device and to enhance the durability of the display device, thereby resolving the problems of the add-on type and on-cell type touch sensors.

In general, a related art touch sensor integrated type liquid crystal display device displays images by adjusting light transmittance of liquid crystal using an electric field. For this, the liquid crystal display device includes a liquid crystal panel in which liquid crystal cells are arranged in a matrix type and a driving circuit for driving the liquid crystal panel.

The liquid crystal panel includes a color filter array and a thin film transistor (TFT) array with a liquid crystal layer interposed therebetween. The TFT array includes gate lines and data lines crossing each other, and liquid crystal cells disposed in areas defined by the crossing of the gate lines and the data lines. The TFT array includes pixel electrodes and common electrodes for applying the electric field to the liquid crystal cells. Each of the pixel electrodes is connected to any one of the data lines through a source and drain electrode of a TFT serving as a switching element. A gate electrode of the TFT is connected to any one of the gate lines to apply pixel voltages to the pixel electrodes line-by-line. The color filter array includes black matrixes and color filters.

The driving circuit includes a gate driver for driving the gate lines, a data driver for the data lines, a timing controller for controlling the gate driver and the data driver, and a power supplier for driving voltages of the display device.

The gate driver and the data driver may be integrated by using a plurality of integrated chips (ICs). The integrated gate driver ICs and the integrated data driver ICs are mounted on a tape carrier package (TCP) to be connected to the TFT array by a tape automated bonding (TAB) method or a chip on glass (COG) method.

The gate driver ICs or data driver ICs mounted on the liquid crystal panel, that is, to a lower glass substrate of the liquid crystal panel, by the COG method, and are connected to each other using a line-on-glass (LOG) method in which signal lines are mounted on the lower glass substrate. And also the gate driver ICs and data driver ICs receives control signals from the timing controller and driving voltages from the power supplier through flexible printed circuits (FPCs).

Hereinafter, a related art a touch sensor integrated type display device according to the COG method will be described with reference to FIG. 1. FIG. 1 is a top plan view illustrating a related art touch sensor integrated type display device.

With reference to FIG. 1, the touch sensor integrated type display device includes an active area AA displaying data and a bezel area BA disposed at outside of the active area AA. The bezel area BA includes wires and a gate driving circuit formed therein.

More specifically, the active area AA includes a plurality of data lines and a plurality of gate lines, a plurality of liquid crystal cells, a plurality of pixel electrodes, a plurality of common electrodes, and a plurality of thin film transistors. The plurality of common electrodes serve as touch driving electrodes and touch sensing electrodes.

A touch sensor disposed in the active area AA includes 1-1 to 1-4 touch electrodes Tx11 to Tx14, Tx21 to Tx24, Tx31 to Tx34, and Tx41 to Tx44; 1-1 to 1-4 sub-routing wires TW11 to TW14, TW21 to TW24, TW31 to TW34, and TW41 to TW44; and a plurality of second touch electrodes Rx1 to Rx3. The 1-1 to 1-4 touch electrodes Tx11 to Tx14, Tx21 to Tx24, Tx31 to Tx34, and Tx41 to Tx44 are divided in a first direction (e.g., the x-axis direction) and second direction (e.g., the y-axis direction), which cross each other. The 1-1 to 1-4 sub-routing wires TW11 to TW14, TW21 to TW24, TW31 to TW34, and TW41 to TW44 are connected to the 1-1 to 1-4 touch electrodes Tx11 to Tx14, Tx21 to Tx24, Tx31 to Tx34, and Tx41 to Tx44, respectively, and are arranged in the second direction. Each of the plurality of second touch electrodes Rx1 to Rx3 is disposed between first touch electrodes Tx11 to Tx41 and Tx12 to Tx42, between Tx12 to Tx42 and Tx13 to Tx43, and between Tx13 to Tx43 and Tx14 to Tx44, neighbored in the first direction.

The plurality of first touch electrodes Tx11 to Tx14, Tx21 to Tx24, Tx31 to Tx34, and Tx41 to Tx44 are connected to first connection wires (not shown), and a plurality of first main-routing wires TW1 to TW4 (shown as TW1*a* to TW4*a* and TW1*b* to TW2*b*) through the first sub-routing wires TW11 to TW14, TW21 to TW24, and TW31 to TW34, thereby forming a plurality of first touch electrode serials Tx1 to Tx4 arranged in the first direction in active area AA.

More specifically, the 1-1 touch electrodes Tx11 to Tx14 (arranged in a first row) are connected to each other by the 1-1 sub-routing wires TW11 to TW14 connected to the 1-1 touch electrodes Tx11 to Tx14, respectively; a 1-1 connection wire that connects the 1-1 sub-routing wires TW11 to TW14; and a 1-1 main-routing wire TW1 connected to the 1-1 connection wire, thereby forming the 1-1 touch electrode serial Tx1.

The 1-2 touch electrodes Tx21 to Tx24 (arranged in a second row) are connected to each other by the 1-2 sub-routing wires TW21 to TW24 connected to the 1-2 touch electrodes Tx21 to Tx24, respectively; a 1-2 connection wire that connects 1-2 sub-routing wires TW21 to TW24; and a 1-2 main-routing wire TW2 connected to the 1-2 connection wire, thereby forming 1-2 touch electrode serial Tx2.

The 1-3 touch electrodes Tx31 to Tx34 (arranged in a third row) are connected to each other by the 1-3 sub-routing wires TW31 to TW34 connected to the 1-3 touch electrodes Tx31 to Tx34, respectively; a 1-3 connection wire which connects 1-3 sub-routing wires TW31 to TW34; and a 1-3 main-routing wire TW3 connected to the 1-3 connection wire, thereby forming 1-3 touch electrode serial Tx3.

The 1-4 touch electrodes Tx41 to Tx44 (arranged in a fourth row) are connected to each other by the 1-4 sub-routing wires TW41 to TW44 connected to the 1-4 touch electrodes Tx41 to Tx44, respectively; a 1-4 connection wire that connects 1-4 sub-routing wires TW41 to TW44; and a 1-4 main-routing wire TW4 connected to the 1-4 connection wire, thereby forming 1-4 touch electrode serial Tx4.

A 2-1 touch electrode Rx1 of the plurality of second electrodes Rx1 to Rx3 is disposed between 1-5 touch electrodes Tx11 to Tx41 (arranged in a first column) and 1-6 touch electrodes Tx12 to Tx42 (arranged in a second column), thereby forming 2-1 touch electrode serial Rx1.

A 2-2 touch electrode Rx2 of the plurality of second electrodes Rx1 to Rx3 is disposed between 1-6 touch electrodes Tx12 to Tx42 (arranged in a second column) and 1-7 touch electrodes Tx13 to Tx43 (arranged in a third column), thereby forming 2-3 touch electrode serial Rx3.

A 2-3 touch electrode Rx3 of the plurality of second electrodes Rx1 to Rx3 is disposed between 1-7 touch electrodes Tx13 to Tx43 (arranged in a third column) and 1-8 touch electrodes Tx14 to Tx44 (arranged in a fourth column), thereby forming 2-4 touch electrode serial Rx4.

The first and second touch electrodes Tx11 to Tx14, Tx21 to Tx24, Tx31 to Tx34, Tx41 to Tx44, and Rx1 to Rx3 serve as common electrodes of the display device and are operated as the common electrodes in a display mode and are operated as touch driving and sensing electrodes for perceiving touch positions in a touch mode.

The bezel area BA is disposed outside of the active area AA. The bezel area BA includes data driving integrated chips (ICs) D-IC; gate driving ICs G-IC; flexible printed circuits FPC; data links DL; gate links GL; the 1-1 to 1-4 sub-routing wires TW11 to TW14, TW21 to TW24, TW31 to TW34, and TW41 to TW44; 1 to 4 grouping wires GR1 to GR4; the 1-1 to 1-4 main-routing wires TW1 to TW4; 2-1 to 2-3 routing wires RW1 to RW3, data line-on-glass (LOG) type wires D_LOG; and gate line-on-glass type wires G_LOG. The flexible printed circuits FPC are attached to one edge of the bezel area BA to deliver control signals and driving voltages supplied from the outside. The data links DL connect the data lines (not shown) in the active area AA to the data driving ICs D-IC in the bezel area BA. The gate links GL connect the gate lines (not shown) in the active area AA to the gate driving ICs G-IC in the bezel area BA. The 1-1 to 1-4 sub-routing wires TW11 to TW14, TW21 to TW24, TW31 to TW34, and TW41 to TW44 are extended from the active area AA to the bezel area BA. The 1 to 4 grouping wires GR1 to GR4 are connected to the 1-1 to 1-4 sub-routing wires TW11 to TW14, TW21 to TW24, TW31 to TW34, and TW41 to TW44 such that the 1-1 to 1-4 sub-routing wires TW11 to TW14, TW21 to TW24, TW31 to TW34, and TW41 to TW44 are respectively grouped. The 1-1 to 1-4 main-routing wires TW1 to TW4 connect the 1 to 4 grouping wires GR1 to GR4 to the flexible printed circuits FPC, with TW1*a* to TW4*a* being at one end of the 1 to 4 grouping wires GR1 to GR4, and with TW1*b* to TW4*b* being at the other end of the 1 to 4 grouping wires GR1 to GR4. The data LOG wires D_LOG connect the flexible printed circuits FPC to the data driving ICs D-IC. The gate LOG wire G_LOG connects the flexible printed circuits FPC to the gate driving ICs G-IC.

In the related art touch sensor integrated type display device, there are regions where the gate LOG wires G_LOG overlap at least one portion of the 1-1 to 1-4 grouping wires GR1 to GR4 at lower right corner of the bezel area BA. The gate LOG wires G_LOG are intensively disposed in a narrow area at the lower corner of the bezel area BA to connect the flexible printed circuit FPC disposed at the lowermost end of the bezel area BA to the gate driving IC G-IC disposed at the rightmost end of the bezel area BA because the gate LOG wires G_LOG are disposed between the flexible printed circuit FPC and the gate driving IC G-IC to supply gate control signals from the outside to the gate driving IC G-IC. Also, the 1-1 to 1-4 grouping wires GR1 to GR4 are disposed at a lower portion of the bezel area BA. Accordingly, the gate LOG wires G_LOG overlap at least one portion of the 1-1 to 1-4 grouping wires GR1 to GR4. In FIG. 1, the gate LOG wires are indicated as an area G_LOG where the gate LOG wires are disposed. Therefore, G_LOG indicates the gate LOG wires or the area where the gate LOG wires are disposed as desired for the device.

The grouping wires GR1 to GR4 are simultaneously formed with source/drain electrodes of thin film transistors of the liquid crystal display panel. The gate LOG wires G_LOG are formed when gate electrodes of the thin film transistors are formed, or when the source/drain electrodes are formed. Alternatively, the gate LOG wires G_LOG may be formed of a double layer including a gate metal layer and a source/drain metal layer. The gate metal layer of the gate LOG wire G_LOG is formed when the gate electrode of the thin film transistor is formed, and the source/drain metal layer of the gate LOG wire G_LOG is formed when the source/drain electrode of the thin film transistor is formed.

To obviate that the grouping wires GR1 to GR4 of the touch sensor overlap with the gate LOG wires G_LOG, it should be considered that a length of the gate grouping wires G_LOG is reduced or the size of the gate LOG area where the gate LOG wires is disposed is reduced.

However, if the length of the grouping wire (e.g., the grouping wire GR4 of FIG. 1) is reduced, there is a problem that a touch performance is deteriorated because at least one of the touch electrodes (e.g., the touch electrode Tx44) cannot be connected to the reduced grouping wire GR4.

Also, if the gate LOG area G_LOG is reduced, a cross-sectional area of each the gate wires are reduced, or it is impossible to form the gate LOG wires having the double layer. Accordingly, a total resistance of the gate LOG wires is greatly increased, which deteriorates performance of the display performance and touch performance.

SUMMARY

Accordingly, embodiments of the present application are directed to a touch sensor integrated type display device that substantially obviates one or more problems due to the limitations and disadvantages of the related art.

An object of embodiments is to provide a touch sensor integrated type display device, which may prevent display and touch performance from being deteriorated without reducing a wire for a touch sensor or a gate LOG area in a bezel area.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a touch sensor integrated type display device, including: an active area, a bezel area outside the active area, the bezel area including: a gate driving IC, a flexible printed circuit board, a data driving integrated circuit (IC), and gate line-on-glass (LOG) wires between the flexible printed circuit board and the gate driving IC, a plurality of first electrodes in the active area and arranged in first and second directions crossing each other, a plurality of second electrodes in the active area, and arranged in the second direction and alternately disposed with the plurality of first electrodes arranged along the first direction, a plurality of grouping wires in the bezel area between the active area and the data driving IC and arranged in parallel to each other, length of at least one of the plurality of grouping wires being different from that of remained grouping wires, such that the plurality of grouping wires are non-overlapped with the gate LOG wires, a plurality of grouping wires in the bezel area between the active area and the data driving IC and arranged in parallel to each other, lengths of the plurality of grouping wires being different from each other, such that the plurality of grouping wires are non-overlapped with the gate LOG wires, and a plurality of first sub-routing wires connecting the first electrodes, corresponding to one line arranged in the first direction among the plurality of first electrodes, to each of the plurality of grouping wires.

Other systems, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
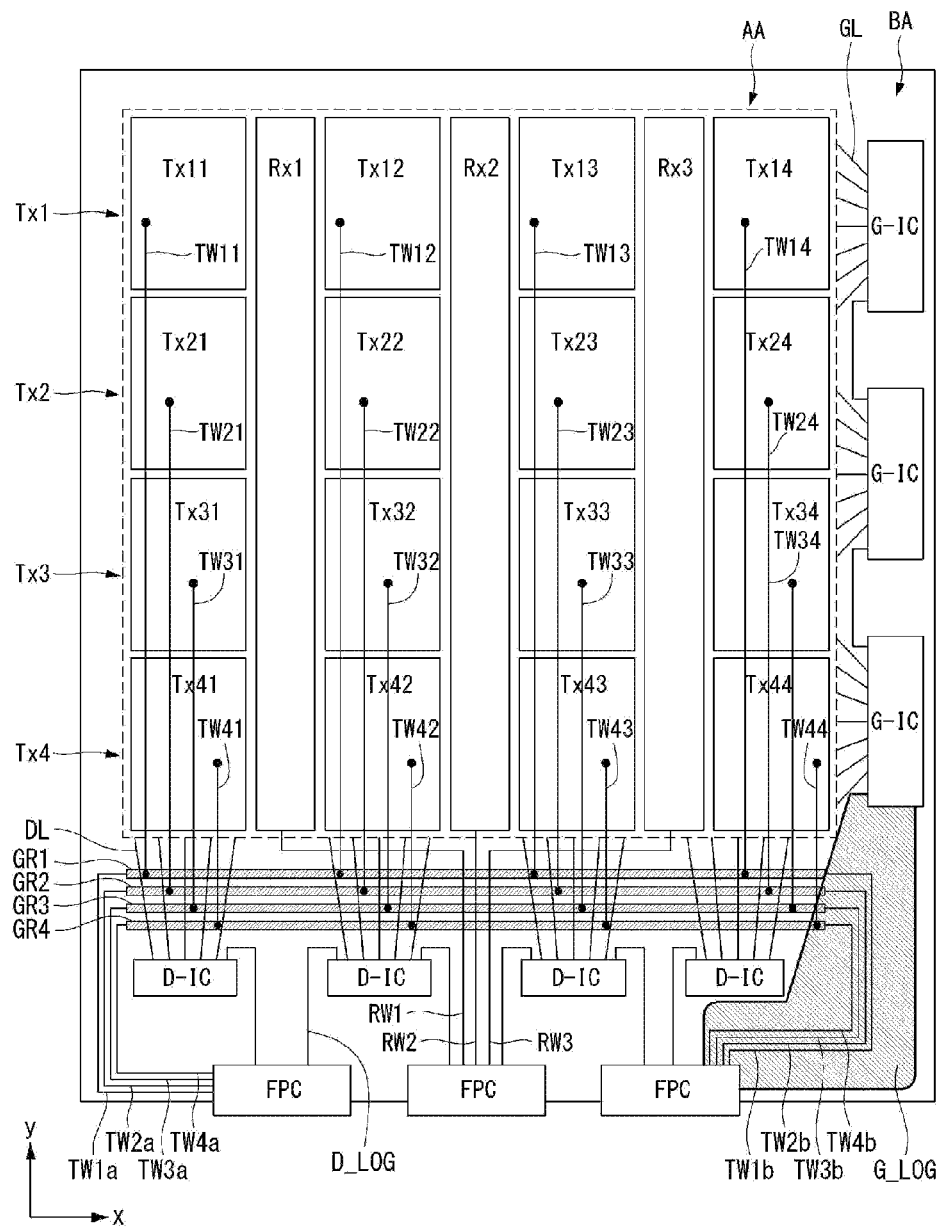
FIG. 1 is a top plan view illustrating a related art touch sensor integrated type display device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Hereinafter, embodiments will be described in detail with reference to the accompanying drawings.

Figure 2:
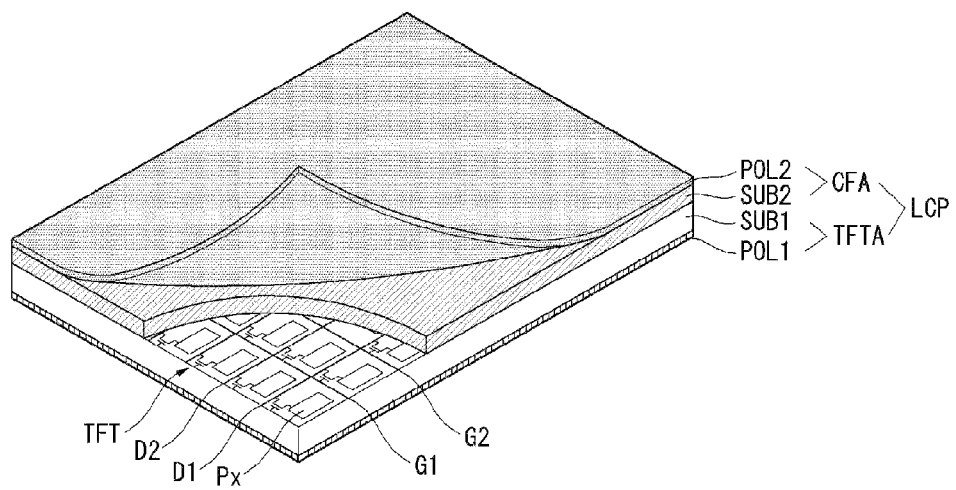
FIG. 2 is a partial exploded perspective view schematically illustrating a touch sensor integrated type display device according to an embodiment.
Figure 3:
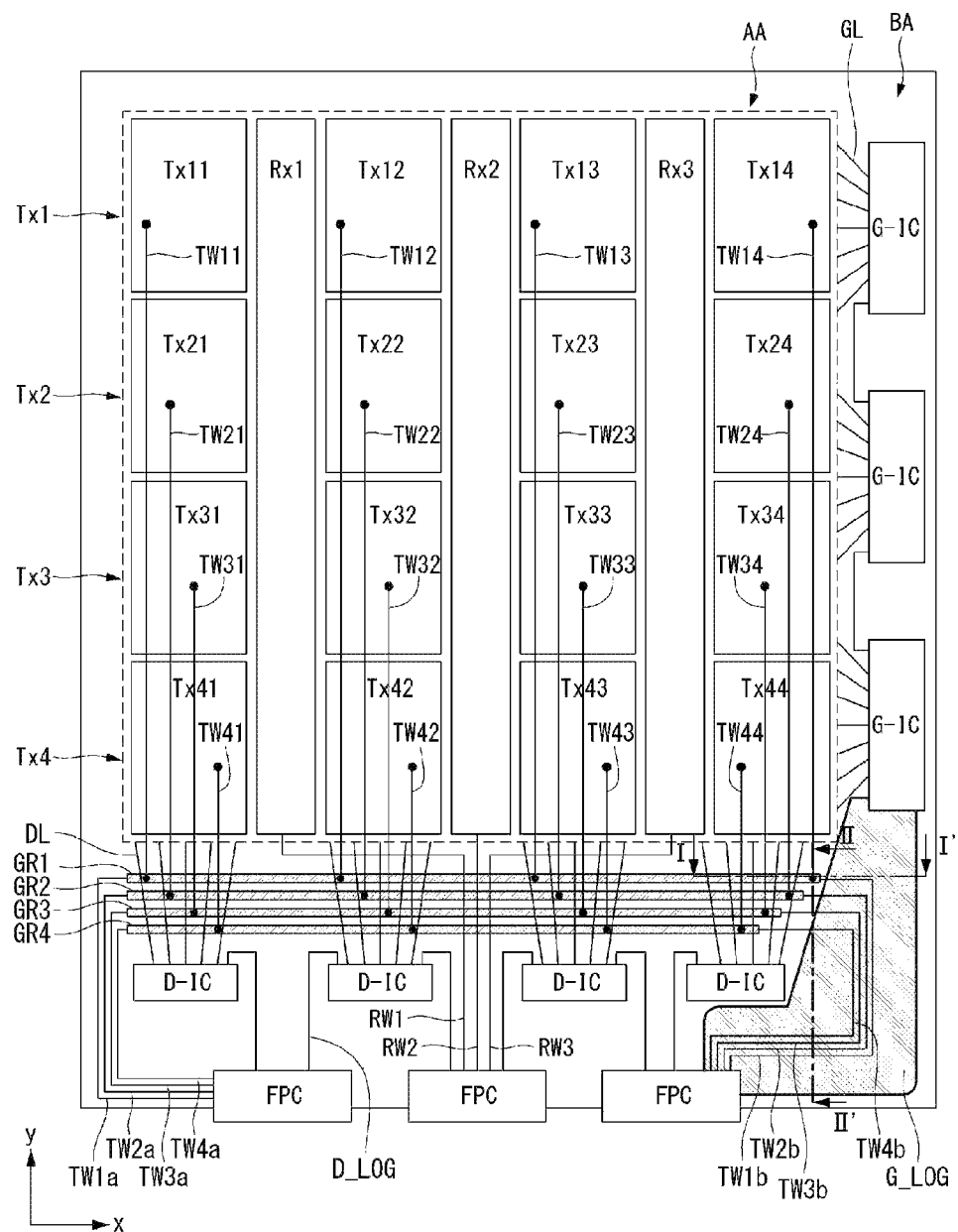
FIG. 3 is a top plan view illustrating a touch sensor integrated type display device according to an embodiment.
Figure 4A:
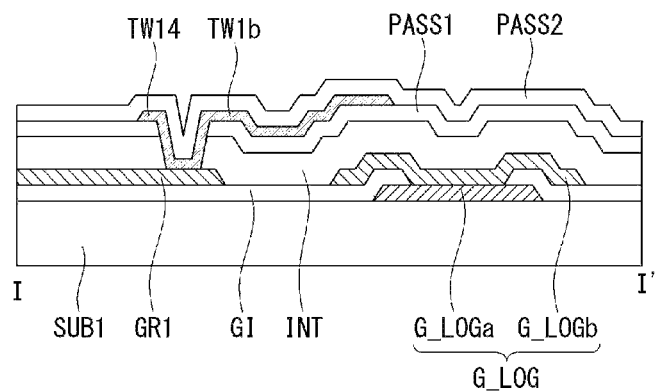
FIG. 4A is a cross-sectional view taken along line I-I' of FIG. 3.
Figure 4B:
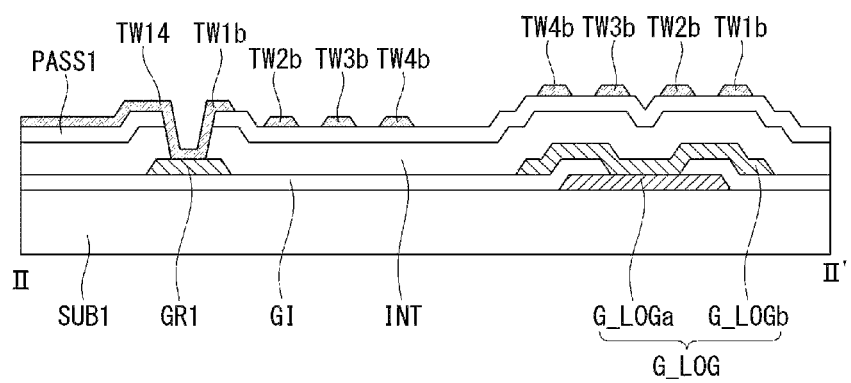
FIG. 4B is a cross-sectional view taken along line II-IF of FIG. 3.

A touch sensor integrated type display device according to an example embodiment is described in detail with reference to FIGS. 2 to 4B. FIG. 2 is a partial exploded perspective view schematically illustrating a touch sensor integrated type display device according to an embodiment. FIG. 3 is a top plan view illustrating a touch sensor integrated type display device according to an embodiment. FIGS. 4A and 4B are cross-sectional views of a portion of the bezel area shown in the FIG. 3 example. FIG. 4A is a cross-sectional view taken along line I-I' of FIG. 3. FIG. 4B is a cross-sectional view taken along line II-IF of FIG. 3.

With reference to FIG. 2, the touch sensor integrated type display device according to an embodiment may include a liquid crystal display panel LCP including a color filter array CFA and a thin film transistor (TFT) array TFTA with a liquid crystal layer (not shown) interposed therebetween.

The TFT array TFTA may include a plurality of gate lines G1, G2 in parallel on a first substrate SUB1 in a first direction (for example, an x-axis direction); a plurality of data lines D1, D2 in parallel in a second direction (for example, a y-axis direction) and crossing the plurality of gate lines G1, G2; liquid crystal cells (not shown) disposed at areas defined by the crossings of the gate lines G1, G2 and the data lines D1, D2; thin film transistors TFT at crossings of the gate lines G1, G2 and the data lines D1, D2; a plurality of pixel electrodes Px for charging the liquid crystal cells with a data voltage; and a plurality of common electrodes (not shown) positioned opposite the plurality of pixel electrodes Px.

The color filter array CFA may include black matrixes (not shown) and color filters (not shown), which may be disposed on a second substrate SUB2. Polarizing plates POL1, POL2 may be respectively attached to outer surfaces of the first substrate SUB1 and the second substrate SUB2 of the liquid crystal display panel LCP. Alignment layers (not shown) for setting a pre-tilt angle of liquid crystals may be respectively formed on inner surfaces of the first substrate SUB1 and the second substrate SUB2 and may contact the liquid crystals. A column spacer (not shown) may be formed between the first substrate SUBS1 and the second substrate SUBS2 to maintain cell gaps of the liquid crystal cells.

The common electrodes may be formed on the second substrate SUB2 in a vertical electric field driving manner, such as a twisted nematic (TN) mode or a vertical alignment (VA) mode. Further, the common electrodes may be formed on the first substrate SUB1 along with the pixel electrodes Px in a horizontal electric field driving manner, such as an in-plane switching (IPS) mode or a fringe field switching (FFS) mode. As an example embodiment, the common electrodes in the horizontal electric field driving manner are described herein as an example.

With reference to FIGS. 3, 4A, and 4B, the touch sensor integrated type display device according to an embodiment may include an active area AA displaying data and a bezel area BA disposed at outside of the active area AA. The active area AA may include touch electrodes therein, and the bezel area BA may include wires and a gate driving circuit therein.

The active area AA of the TFT array TFTA may include the plurality of gate lines G1, G2; the plurality of data lines D1, D2; the plurality of liquid crystal cells; the plurality of pixel electrodes Px; and the plurality of common electrodes. The plurality of common electrodes may generate the electric field together with the pixel electrodes Px, and may serve as touch electrodes for touch driving and touch sensing. Hereinafter, the common electrodes are referred to as first touch electrodes Tx11 to Tx14, Tx21 to Tx24, Tx31 to Tx34, and Tx41 to Tx44 for touch driving (or touch sensing) and second touch electrodes Rx1 to Rx3 for touch sensing (or touch driving). It should be appreciated that the designation of driving and sensing electrodes may be interchanged as desired.

The touch sensor disposed in active area AA of the TFT array TFTA may include a plurality of 1-1 to 1-4 touch electrodes Tx11 to Tx14, Tx21 to Tx24, Tx31 to Tx34, and Tx41 to Tx44, a plurality of 1-1 to 1-4 sub-routing wires TW11 to TW14, TW21 to TW24, TW31 to TW34, and TW41 to TW44, and a plurality of 2-1 to 2-3 touch electrodes Rx1 to Rx3. The plurality of 1-1 to 1-4 touch electrodes Tx11 to Tx14, Tx21 to Tx24, Tx31 to Tx34, and Tx41 to Tx44 may be divided in a first direction (e.g., an x-axis direction) and a second direction (e.g., an y-axis direction), which cross each other. The plurality of 1-1 to 1-4 sub-routing wires TW11 to TW14, TW21 to TW24, TW31 to TW34, and TW41 to TW44 may be connected to the plurality of 1-1 to 1-4 touch electrodes Tx11 to Tx14, Tx21 to Tx24, Tx31 to Tx34, and Tx41 to Tx44, respectively, and may be arranged in the second direction. Each of the plurality of 2-1 to 2-3 touch electrodes Rx1 to Rx3 may be respectively disposed between the 1-1 to 1-4 touch electrodes neighbored in the first direction such that they are arranged in the second direction, that is, between the touch electrodes Tx11 to Tx41 and Tx12 to Tx42, between Tx12 to Tx42 and Tx13 to Tx43, and between Tx13 to Tx43 and Tx14 to Tx44.

The 1-1 sub-routing wire TW11 may be connected to the 1-1 touch electrode Tx11 disposed in a first row and a first column. The 1-1 sub-routing wire TW11 may extend from the active area AA to the bezel area BA to overlap the 1-1 to 1-4 touch electrodes Tx11, Tx21, Tx31, and Tx41. The 1-2 sub-routing wire TW21 may be connected to the 1-2 touch electrode Tx21 disposed in a second row and the first column. The 1-2 sub-routing wire TW21 may extend from the active area AA to the bezel area BA to overlap the touch 1-2 to 1-4 touch electrodes Tx21, Tx31, and Tx41. The 1-3 sub-routing wire TW31 may be connected to the 1-3 touch electrode Tx31 disposed in a third row and the first column. The 1-3 sub-routing wire TW31 may extend from the active area AA to the bezel area BA to overlap the touch 1-3 and 1-4 touch electrodes Tx31 and Tx41. The 1-4 sub-routing wire TW41 may be connected to the 1-4 touch electrode Tx41 disposed in a fourth row and the first column. The 1-4 sub-routing wire TW41 may extend from the active area AA to the bezel area BA to overlap the 1-4 touch electrode Tx41.

Accordingly, the first group of 1-1 to 1-4 sub-routing wires TW11, TW21, TW31, and TW41 arranged in the second direction may be sequentially disposed along the first direction in the active area AA based on a left boundary line of the active area AA, such that a first imaginary line (not shown) connecting contact points of the 1-1 to 1-4 touch electrodes Tx11, Tx21, Tx31, and Tx41 and the 1-1 to 1-4 sub-routing wires TW11, TW21, TW31, and TW41 may have a first slope. The first slope may be declined from a left-upper side to a right-lower side.

The 1-1 sub-routing wire TW12 may be connected to the 1-1 touch electrode Tx12 disposed in the first row and a second column. The 1-2 sub-routing wire TW12 may extend from the active area AA to the bezel area BA to overlap the 1-1 to 1-4 touch electrodes Tx12, Tx22, Tx32, and Tx42. The 1-2 sub-routing wire TW22 may be connected to the 1-2 touch electrode Tx22 disposed in a second row and the second column. The 1-2 sub-routing wire TW22 may extend from the active area AA to the bezel area BA to overlap the touch 1-2 to 1-4 touch electrodes Tx22, Tx32, and Tx42. The 1-3 sub-routing wire TW320 may be connected to the 1-3 touch electrode Tx32 disposed in a third row and the second column. The 1-3 sub-routing wire TW32 may extend from the active area AA to the bezel area BA to overlap the touch 1-3 and 1-4 touch electrodes Tx32 and Tx42. The 1-4 sub-routing wire TW42 may be connected to the 1-4 touch electrode Tx42 disposed in a fourth row and the second column. The 1-4 sub-routing wire TW42 may extend from the active area AA to the bezel area BA to overlap the 1-4 touch electrode Tx42.

Accordingly, the second group of 1-1 to 1-4 sub-routing wires TW12, TW22, TW32, and TW42 arranged in the second direction may be sequentially disposed along the first direction in the active area AA based on a left boundary line of the active area AA, such that a second imaginary line (not shown) connecting contact points of the 1-1 to 1-4 touch electrodes Tx12, Tx22, Tx32, and Tx42 and the 1-1 to 1-4 sub-routing wires TW12, TW22, TW32, and TW42 may have a second slope. The second slope may be declined from the left-upper side to the right-lower side.

The 1-1 sub-routing wire TW13 may be connected to the 1-1 touch electrode Tx13 disposed in the first row and a third column. The 1-2 sub-routing wire TW13 may extend from the active area AA to the bezel area BA to overlap the 1-1 to 1-4 touch electrodes Tx13, Tx23, Tx33, and Tx43. The 1-2 sub-routing wire TW23 may be connected to the 1-2 touch electrode Tx23 disposed in a second row and the second column. The 1-2 sub-routing wire TW23 may extend from the active area AA to the bezel area BA to overlap the touch 1-2 to 1-4 touch electrodes Tx23, Tx33, and Tx43. The 1-3 sub-routing wire TW33 may be connected to the 1-3 touch electrode Tx33 disposed in a third row and the third column. The 1-3 sub-routing wire TW33 may extend from the active area AA to the bezel area BA to overlap the touch 1-3 and 1-4 touch electrodes Tx33 and Tx43. The 1-4 sub-routing wire TW43 may be connected to the 1-4 touch electrode Tx43 disposed in a fourth row and the third column. The 1-4 sub-routing wire TW43 may extend from the active area AA to the bezel area BA to overlap the 1-4 touch electrode Tx43.

Accordingly, the third group of 1-1 to 1-4 sub-routing wires TW13, TW23, TW33, and TW43 arranged in the second direction may be sequentially disposed along the first direction in the active area AA based on a left boundary line of the active area AA, such that a third imaginary line (not shown) connecting contact points of the 1-1 to 1-4 touch electrodes Tx13, Tx23, Tx33, and Tx43 and the 1-1 to 1-4 sub-routing wires TW13, TW23, TW33, and TW43 may have a third slope. The third slope may be declined from the left-upper side to the right-lower side.

The 1-1 to 1-4 sub-routing wires TW14, TW24, TW34, and TW44 respectively connected to the 1-1 to 1-4 touch electrodes Tx14, Tx24, Tx34, and Tx44 arranged in the fourth column are differently arranged from the 1-1 to 1-4 sub-routing wires TW11 to TW41, TW12 to TW42, and TW13 to TW43 arranged in first to third columns.

For example, the 1-4 sub-routing wire TW44 may be connected to the 1-4 touch electrode Tx44 disposed in the fourth row and the fourth column. The 1-4 sub-routing wire TW44 may extend from the active area AA to the bezel area BA to overlap the 1-4 touch electrode Tx44. The 1-3 sub-routing wire TW34 may be connected to the 1-3 touch electrode Tx34 disposed in the third row and the fourth column. The 1-3 sub-routing wire TW34 may extend from the active area AA to the bezel area BA to overlap the touch 1-3 to 1-4 touch electrodes Tx34 and Tx44. The 1-2 sub-routing wire TW24 may be connected to the 1-2 touch electrode Tx24 disposed in the second row and the fourth column. The 1-2 sub-routing wire TW24 may extend from the active area AA to the bezel area BA to overlap the touch 1-2 to 1-4 touch electrodes Tx24, Tx34, and Tx44. The 1-1 sub-routing wire TW14 may be connected to the 1-1 touch electrode Tx14 disposed in the first row and the fourth column. The 1-1 sub-routing wire TW14 may extend from the active area AA to the bezel area BA to overlap the 1-1 to 1-4 touch electrode Tx14, Tx24, Tx34, and Tx44.

Accordingly, the fourth group of 1-4 to 1-1 sub-routing wires TW44, TW34, TW24, and TW14 arranged in the second direction may be sequentially disposed along the first direction in the active area AA based on a left boundary line of the active area AA, such that a fourth imaginary line (now shown) connecting contact points of the 1-4 to 1-1 touch electrodes Tx44, Tx34, Tx24, and Tx14 and the 1-4 to 1-1 sub-routing wires TW44, TW34, TW24, and TW14 may have a fourth slope. The fourth slope may be declined from a right-upper side to a left-lower side. That is, the fourth slope may be reversely declined compared to the first to third slopes.

In the touch sensor integrated type liquid crystal display device according to an embodiment, the 1-4 to 1-1 sub-routing wires TW44, TW34, TW24, and TW14 connected to the 1-4 to 1-1 touch electrodes Tx44, Tx34, Tx24, and Tx14 arranged in the last column adjacent to the gate driver IC G-IC may be symmetrical to the 1-1 to 1-4 sub-routing wires TW13, TW23, TW33, and TW43 based on the 1-3 touch electrode Rx3, disposed between the touch electrodes Tx13 to Tx43 in the third column (adjacent to the last column of the first touch electrodes) and the touch electrodes Tx14 to Tx44 in the fourth column (that is, the last column of the first touch electrodes), as the center.

The 1-1 to 1-4 touch electrodes Tx11 to Tx14, Tx21 to Tx24, Tx31 to Tx34, and Tx41 to Tx44 may be respectively connected to the 1-1 to 1-4 sub-routing wires TW11 to TW14, TW21 to TW24, TW31 to TW34, and TW41 to TW44. The 1-1 to 1-4 sub-routing wires TW11 to TW14 respectively connected the 1-1 to 1-4 touch electrodes Tx11 to Tx14 may be connected to the first grouping wire GR1 in the bezel area BA; the 1-1 to 1-4 sub-routing wires TW21 to TW24 respectively connected the 1-1 to 1-4 touch electrodes Tx21 to Tx24 may be connected to the second grouping wire GR2 in the bezel area BA; the 1-1 to 1-4 sub-routing wires TW31 to TW34 respectively connected the 1-1 to 1-4 touch electrodes Tx31 to Tx34 may be connected to the third grouping wire GR3 in the bezel area BA; and the 1-1 to 1-4 sub-routing wires TW41 to TW44 respectively connected the 1-1 to 1-4 touch electrodes Tx41 to Tx44 may be connected to the fourth grouping wire GR4 in the bezel area BA. Accordingly, 1-1 to 1-4 touch electrode serials Tx1 to Tx4 may be formed in the first direction according to the above. The first and second touch electrodes Tx11 to Tx14, Tx21 to Tx24, Tx31 to Tx34, Tx41 to Tx44, and Rx1 to Rx3 may be formed by dividing a common electrode of the display device. Accordingly, the first and second touch electrodes Tx11 to Tx14, Tx21 to Tx24, Tx31 to Tx34, Tx41 to Tx44, and Rx1 to Rx3 may serve as a common electrode in a display mode, and may serve as touch driving and touch sensing electrodes in a touch mode. The display mode and the touch mode may be driven in time division during one horizontal period.

The bezel area BA may be disposed at outside of the active area AA. The bezel area BA may include data driving ICs D-IC; gate driving ICs G-IC; flexible printed circuits FPC; data links DL; gate links GL; the 1-1 to 1-4 sub-routing wires TW11 to TW14, TW21 to TW24, TW31 to TW34, and TW41 to TW44; the first to fourth grouping wires GR1 to GR4; 1-1 to 1-4 main routing wires TW1a and TW1b, TW2a and TW2b, TW3a and TW3b, TW4a and TW4b; 2-1 to 2-3 routing wires RW1 to RW3; data line-on-glass (LOG) wires D_LOG; and gate line-on-glass (LOG) wires G_LOG. The data driving ICs D-IC may be disposed at one outside of the active area AA. The gate driving ICs G-IC may be disposed at another side adjacent to the one outside of the active area AA. The flexible printed circuits FPC may be coupled to edge of the one side in the bezel area BA to supply control signals and driving voltages from external elements to internal display and touch elements. The data links DL may connect data lines (now shown) in the active area AA to the data driving ICs D-IC. The gate links GL may connect gate lines (now shown) in active area AA to the gate driving ICs G-IC. The 1-1 to 1-4 sub-routing wires TW11 to TW14, TW21 to TW24, TW31 to TW34, and TW41 to TW44 may extend from the active area AA to the bezel area BA. The first to fourth grouping wires GR1 to GR4 may respectively group the 1-1 to 1-4 sub-routing wires TW11 to TW14, TW21 to TW24, TW31 to TW34, and TW41 to TW44. The 1-1 to 1-4 main routing wires TW1a and TW1b, TW2a and TW2b, TW3a and TW3b, TW4a and TW4b may respectively connect the first to fourth grouping wires GR1 to GR4 to the flexible printed circuits FPC. The 2-1 to 2-3 routing wires RW1 to RW3 may respectively connect the 2-1 to 2-3 touch electrodes Rx1 to Rx3 to the flexible printed circuits FPC. The data line-on-glass (LOG) wires D_LOG may connect the flexible printed circuits FPC to the data driving ICs D-IC, such that the data driving ICs D-IC may be connected in series. The gate line-on-glass (LOG) wires G_LOG may connect the gate driving ICs G-IC, such that the gate driving ICs G-IC may be connected in series.

The first to fourth grouping wires GR1 to GR4 may be disposed in the bezel area BA between the active area AA and the data driving ICs D-IC, and may be arranged in the first direction (e.g., the x-axis direction) in parallel to each other along the second direction (e.g., the y-axis direction) as shown in the FIG. 3 example.

As a result, the 1-1 touch electrodes Tx11 to Tx14 arranged in the first row may be connected to each other by the 1-1 sub-routing wires TW11 to TW14 and the first grouping wire GR1 to form the 1-1 touch electrode serial Tx1 arranged in the first row.

Also, the 1-2 touch electrodes Tx21 to Tx24 arranged in the second row may be connected to each other by the 1-2 sub-routing wires TW21 to TW24 and the second grouping wire GR2 to form the 1-2 touch electrode serial Tx2 arranged in the second row.

Also, the 1-3 touch electrodes Tx31 to Tx34 arranged in the third row may be connected to each other by the 1-3 sub-routing wires TW31 to TW34 and the third grouping wire GR3 to form the 1-3 touch electrode serial Tx3 arranged in the third row.

Also, the 1-4 touch electrodes Tx41 to Tx44 arranged in the fourth row may be connected to each other by the 1-4 sub-routing wires TW41 to TW44 and the fourth grouping wire GR4 to form the 1-4 touch electrode serial Tx4 arranged in the fourth row.

The 2-1 touch electrode Rx1 of the 2-1 to 2-3 touch electrodes Rx1 to Rx3 may be disposed between the 1-1 to 1-4 touch electrodes Tx11 to Tx41 of the first column and the 1-1 to 1-4 touch electrodes Tx12 to Tx42 of the second column to form the 2-1 touch electrode serial Rx1 of the first column.

The 2-2 touch electrode Rx2 of the 2-1 to 2-3 touch electrodes Rx1 to Rx3 may be disposed between the 1-1 to 1-4 touch electrodes Tx12 to Tx42 of the second column and the 1-1 to 1-4 touch electrodes Tx13 to Tx43 of the third column to form the 2-2 touch electrode serial Rx2 of the second column.

The 2-3 touch electrode Rx3 of the 2-1 to 2-3 touch electrodes Rx1 to Rx3 may be disposed between the 1-1 to 1-4 touch electrodes Tx13 to Tx43 of the third column and the 1-1 to 1-4 touch electrodes Tx14 to Tx44 of the fourth column to form the 2-3 touch electrode serial Rx3 of the third column.

In the touch sensor integrated type display device according to an embodiment, the sub-routing wires TW44, TW34, TW24, and TW14 connected to the touch electrodes Tx44, Tx34, Tx24, and Tx14 positioned in the last column of the active area AA adjacent to the gate driver ICs (G-IC) may be symmetrical to the sub-routing wires TW43, TW33, TW23, and TW13 connected to the touch electrodes Tx43, Tx33, Tx23, and Tx13 adjacent the touch electrodes Tx44, Tx34, Tx24, and Tx14 in a mirror image.

Accordingly, the grouping wires GR1 to GR4 may have lengths different from each other. That is, the first grouping wire GR1 connecting the 1-1 sub-routing wires TW11, TW12, TW13, and TW14 may be longer than each of the second to fourth grouping wires GR2 to GR4. The second grouping wire GR2 connecting the 1-2 sub-routing wires TW21, TW22, TW23, and TW24 may be longer than each of the third and fourth grouping wires GR3 and GR4, and the third grouping wire GR2 connecting the 1-3 sub-routing wires TW31, TW32, TW33, and TW34 may be longer than the fourth grouping wire GR4 connecting the 1-4 sub-routing wires TW41, TW42, TW43, and TW44. As a result, one end of the first to fourth grouping wires GR1 to GR4 adjacent to the gate driver ICs G-IC may be sequentially declined from an upper part of the bezel area BA to a lower part to be directed to an inner part of the bezel area BA as shown in the FIG. 3 example. That is, lengths of the first to fourth grouping wires GR1 to GR4 may be different from each other. However, the lengths of the first to fourth grouping wires GR1 to GR4 are not limited to that set forth above, and may be adjusted to non-overlap the gate LOG wire G_LOG. For example, length of at least one of the first to fourth grouping wires GR1 to GR4 is different from that of the remained grouping wires, such that the first to fourth grouping wires GR1 to GR4 are non-overlapped with the gate LOG wires. Accordingly, none of the first to fourth grouping wires GR1 to GR4 may overlap the gate LOG wire G_LOG formed between the printed circuits FPC and the gate drive ICs G-IC.

A relation between the one end of the first to fourth grouping wires GR1 to GR4 and the gate driver ICs G-IC is described in detail with reference to the examples of FIGS. 4A and 4B. FIGS. 4A and 4B illustrate a portion of the end of the first grouping wire GR1 extruded to a right side of the bezel area BA among the first to fourth grouping wires GR1 to GR4 and a portion of the gate LOG wire area where the gate LOG wires G_LOG are formed. FIG. 4A is a cross-sectional view taken along line I-I' of FIG. 3. FIG. 4B is a cross-sectional view taken along line II-IF of FIG. 3. In this disclosure, the symbol "G_LOG" indicates a plurality of gate LOG wires or the gate LOG wire area where the plurality of gate LOG wires are formed.

With reference to FIGS. 4A and 4B, a first layer G_LOGa of the gate LOG wire G_LOG may be formed on the substrate SUB1 in the bezel area BA of the thin film transistor array. A gate insulation layer GI may be formed on the first layer G_LOGa of the gate LOG wire G_LOG. A second layer G_LOGb of the gate LOG wire G_LOG and the first to fourth grouping wires GR1 to GR4 may be formed on the gate insulation layer GI. The second layer G_LOGb and the first to fourth grouping wires GR1 to GR4 may be separated from each other. Also, the second layer G_LOGb of the gate LOG wire G_LOG may contact the first layer G_LOGa via a contact hole which passes through the gate insulation GI. An inter-insulation layer INT and a first passivation layer PASS1 may be sequentially formed on the gate insulation layer GI to cover the second layer G_LOGb and the first to fourth grouping wires GR1 to GR4.

The 1-1 to 1-4 sub-routing wires TW11 to TW14, TW21 to TW24, TW31 to TW34, and TW41 to TW44, and the 1-1 to 1-4 main-routing wires TW1a to TW1b, TW2a to TW2b, TW3a to TW3b, and TW4a to TW4b may be formed on the first passivation layer PASS1. The 1-1 to 1-4 sub-routing wires TW11 to TW14, TW21 to TW24, TW31 to TW34, and TW41 to TW44 and the 1-1 to 1-4 main-routing wires TW1a to TW1b, TW2a to TW2b, TW3a to TW3b, and TW4a to TW4b may be connected to the first to fourth grouping wires GR1 to GR4 via contact holes which pass through the first passivation layer PASS1 and the inter-insulation layer INT. A second passivation layer PASS2 may be formed on the first passivation layer PASS1 to cover the 1-1 to 1-4 sub-routing wires TW11 to TW14, TW21 to TW24, TW31 to TW34, and TW41 to TW44 and the 1-1 to 1-4 main-routing wires TW1a to TW1b, TW2a to TW2b, TW3a to TW3b, and TW4a to TW4b.

The first to fourth groping wires GR1 to GR4 may be disposed between the flexible printed circuits FPC and the gate driver ICs G-IC, and may not overlap the gate LOG wires G_LOG which may supply gate driving signals to the gate driver ICs G-IC.

According to the above example, it may be unnecessary to decrease the size of areas where the gate LOG wires G_LOG and the grouping wires GR1 to GR4 are formed. Also, embodiments may decrease resistance of the gate LOG wires G_LOG because the gate LOG wires G_LOG may be formed of double layers including the gate metal layer and source/drain metal layer. Accordingly, embodiments may improve touch performance as well as display performance by decreasing the resistance of the gate LOG wires G_LOG.

Hereinafter, a touch sensor integrated type display device according to an embodiment will be described in detail with reference to the example of FIG. 5.

Figure 5:
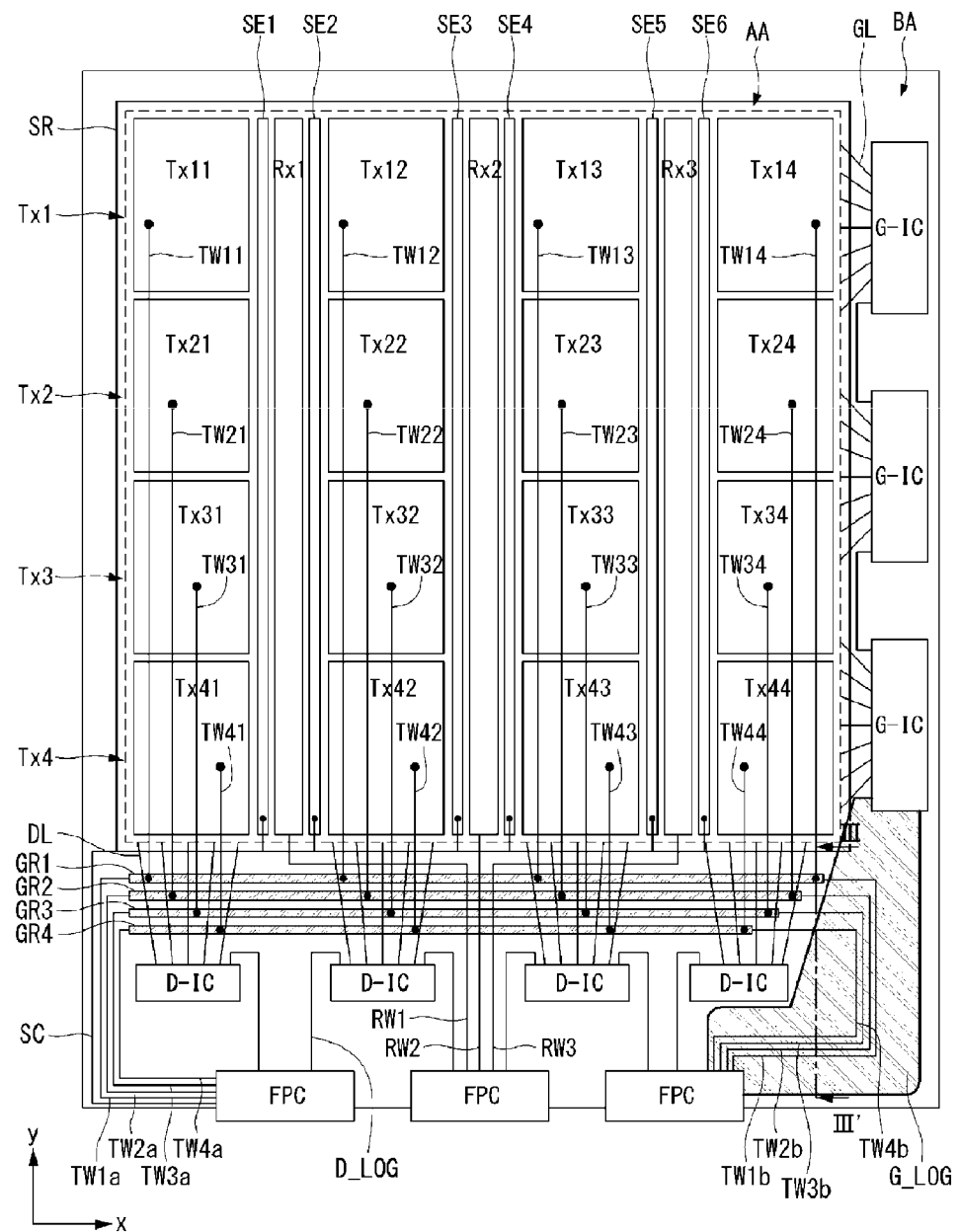
FIG. 5 is a top plan view illustrating a touch sensor integrated type display device according to an embodiment.

The touch sensor integrated type display device illustrated in FIG. 5 is substantially similar to the touch sensor integrated type display device of the FIG. 3 example, with the exception of shielding electrodes SE1 to SE60, a shielding wire SR, and a shielding connection wire SC. The first to sixth shielding electrodes SE1 to SE6 may be respectively disposed between the first touch electrodes Tx11 to Tx41, Tx12 to Tx42, Tx13 to Tx43, and Tx14 to Tx44 arranged at the first to fourth columns, and the 2-1 to 2-3 touch electrodes Rx1 to Rx3, as shown in the FIG. 5 example. The shielding wire SR may be connected to the first to sixth shielding electrodes SE1 to SE6 and may surround the active area AA. The shielding connection wire SC may extend from the shielding wire SR to the flexible printed circuits FPC. Hereinafter, the differences between FIG. 2-4B examples and the FIG. 5-6 examples are described in detail.

With reference to FIG. 5, the first to sixth shielding electrodes SE1 to SE6 may be arranged in the second direction (e.g., a y-axis direction), and may be arranged in parallel to each other along the first direction (e.g., an x-axis direction).

For example, the first shielding electrode SE1 may be disposed between the first column touch electrodes Tx11, Tx21, Tx31, and Tx41 and the 2-1 touch electrode Rx1; and the second shielding electrode SE2 may be disposed between the 2-1 touch electrode Rx1 and the second column touch electrodes Tx12, Tx22, Tx32, and Tx42. Also, the third shielding electrode SE3 may be disposed between the second column touch electrodes Tx12, Tx22, Tx32. and Tx42 and the 2-2 touch electrode Rx2; and the fourth shielding electrode SE4 may be disposed between the 2-2 touch electrode Rx2 and the third column touch electrodes Tx13, Tx23, Tx33, and Tx43. Also, the fifth shielding electrode SE5 may be disposed between the third column touch electrodes Tx13, Tx23, Tx33, and Tx43 and the 2-3 touch electrode Rx3; and the sixth shielding electrode SE6 may be disposed between the 2-3 touch electrode Rx3 and the fourth column touch electrodes Tx14, Tx24, Tx34, and Tx44.

The shielding wire SR may surround the active area AA to form a closed loop, and may be connected to the first to sixth shielding electrodes SE1 to SE6. The shielding connection wire SC may connect the shielding wire SR to the flexible printed circuit FPC.

Figure 6:
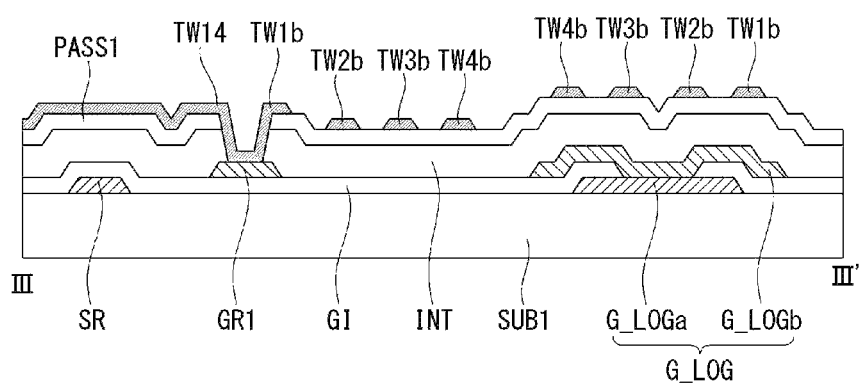
FIG. 6 is a cross-sectional view taken along line III-III' of FIG. 5.

FIG. 6 is a cross-sectional view taken along line III-III' of FIG. 5. FIG. 6 is substantially similar to the FIG. 4B example, with the exception that the shielding wire SC may be formed on the substrate SUB1. Accordingly, the detailed description for FIG. 6 is omitted in order to obviate repeated description.

In the touch sensor integrated type display device, it may be possible to supply any one of a common electrode, a ground voltage, and a direct voltage to the first to sixth shielding electrodes SE1 to SE6 via the shielding connection wire SC connected to the flexible printed circuit wires FPC and the shielding wire SR connected to the shielding connection wire SC from an external power supply (not shown). Accordingly, embodiment may remove an electrical interference between the first touch electrodes Tx11 to Tx41, Tx12 to Tx42, Tx13 to Tx43, and Tx14 to Tx44 disposed in the first to fourth columns and the second touch electrodes Rx1 to Rx3. And embodiments may prevent electrostatic electricity inflowing from the external by the shielding wire SR surrounding the active area AA.

Although example embodiments have been illustrated and described, it will be apparent to those skilled in the art that various changes and modifications can be made without departing from the spirit of this disclosure.

For example, in an example above, the second layer G_LOGb of the gate LOG wire G_LOG contacts the first layer G_LOGa of the gate LOG G_LOG via the contact hole passing through the gate insulation layer GI. However, embodiments are not limited thereto. The connection of the first layer G_LOGa and the second layer G_LOGb of the gate LOG wire G_LOG may be achieved by connecting the first layer G_LOGa and the second layer G_LOGb in the flexible printed circuits FPC and the gate driver IC G_IC without forming the contact hole passing through the gate insulation layer GI.

According to an embodiment, it may be possible to prevent display and touch performance from being deteriorated due to an increase in noise because the grouping wires may be non-overlapped with the gate LOG wires by disposing the grouping wires between the flexible printed circuit board and the gate LOG wires.

It will be apparent to those skilled in the art that various modifications and variations can be made in the present invention without departing from the spirit or scope of the inventions. Thus, it is intended that embodiments of the present invention cover the modifications and variations of this invention provided they come within the scope of the appended claims and their equivalents.

What is claimed is:

1. A touch sensor integrated type display device comprising:
   an active area;
   a bezel area outside the active area, the bezel area comprising:
      a gate driving circuit;
      a flexible printed circuit board;
      a data driving circuit; and
      gate line-on-glass (LOG) wires between the flexible printed circuit board and the gate driving circuit;
   a plurality of first electrodes in the active area and arranged along a first direction and a second direction crossing the first direction;
   a plurality of second electrodes in the active area, the plurality of second electrodes being arranged in the second direction and alternately disposed with the plurality of first electrodes arranged along the first direction;
   a plurality of grouping wires in the bezel area between the active area and the data driving circuit, the plurality of grouping wires being arranged in parallel to each other, a length of at least one of the plurality of grouping wires being different from a length of remaining grouping wires, such that the plurality of grouping wires is non-overlapped with the gate LOG wires; and
   a plurality of first sub-routing wires respectively connecting the first electrodes, corresponding to one line arranged in the first direction among the plurality of first electrodes, to each of the plurality of grouping wires,
   wherein the plurality of grouping wires is disposed on a first layer on which the gate LOG wires are disposed, the plurality of grouping wires being separated from and not overlapping the gate LOG wires,
   wherein:
      at a first side of the plurality of grouping wires adjacent to the gate LOG wires, an end of each of the plurality of grouping wires further from the active area than a first of the plurality of grouping wires closest to the active area extends successively less in the first direction toward the gate driving circuit than an adjacent grouping wire closer to the active area, and
      at a second side of the plurality of grouping wires opposite to the gate LOG wires, all of the plurality of grouping wires end at a same distance in the second direction away from the gate driving circuit, and
   wherein only first sub-routing wires are symmetrical to second sub-routing wires in a mirror image, the first sub-routing wires connecting to first electrodes corresponding to a first line of the first electrodes arranged in the second direction closest to the gate driving circuit along the first direction, the second sub-routing wires connecting to second electrodes corresponding to a last line of the first electrodes arranged in the second direction along the first direction.

2. The display device of claim 1, wherein a difference in length between adjacent pairs of grouping wires is the same.

3. The display device of claim 1, wherein at least one of the gate LOG wires comprises a double-layer construction, comprising:
   a first metal layer on a thin film transistor substrate; and
   a second metal layer on the first layer covering the first metal layer, the second metal layer being connected to the first metal layer via a first contact hole passing through the first layer.

4. The display device of claim 3, wherein each of the plurality of grouping wires is spaced apart from the second metal layer of the gate LOG wires.

5. The display device of claim 4, wherein the plurality of first sub-routing wires is disposed on a second layer covering the plurality of grouping wires and the second layer.

6. The display device of claim 5, wherein first sub-routing wires disposed on a same horizontal line among the plurality of first sub-routing wires are connected to one grouping wire via second contact holes passing through the second layer.

7. The display device of claim 1, further comprising a shielding electrode disposed between:
   the first electrodes arranged in the second direction; and
   the second electrode arranged in the second direction.

8. The display device of claim 7, further comprising a shielding wire surrounding the active area.

9. The display device of claim 8, wherein the shielding wire is on a thin film transistor substrate and crosses the first sub-routing wires.

10. The display device of claim 8, wherein the shielding electrode is connected to the shielding wire.

11. The display device of claim 10, further comprising a shielding connection wire connecting the shielding wire to flexible printed circuit board.

* * * * *